(12) United States Patent
Orbon et al.

(10) Patent No.: US 10,336,446 B2
(45) Date of Patent: Jul. 2, 2019

(54) DIRECTIONAL STIFFNESS BEARING SLEEVE ASSEMBLY FOR ROTOR SYSTEMS

(71) Applicant: Sikorsky Aircraft Corporation, Stratford, CT (US)

(72) Inventors: James Orbon, New Haven, CT (US); Joseph John Andrews, Hamden, CT (US); Devon Cowles, New Milford, CT (US); Stephen V. Poulin, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 250 days.

(21) Appl. No.: 15/343,659

(22) Filed: Nov. 4, 2016

(65) Prior Publication Data

US 2017/0327215 A1 Nov. 16, 2017

Related U.S. Application Data

(60) Provisional application No. 62/274,490, filed on Jan. 4, 2016.

(51) Int. Cl.
| | |
|---|---|
| *B64C 27/35* | (2006.01) |
| *F16C 19/26* | (2006.01) |
| *F16C 21/00* | (2006.01) |
| *F16C 27/06* | (2006.01) |
| *F16C 33/58* | (2006.01) |

(Continued)

(52) U.S. Cl.
CPC ............. *B64C 27/35* (2013.01); *F16C 19/26* (2013.01); *F16C 21/00* (2013.01); *F16C 27/063* (2013.01); *F16C 27/066* (2013.01); *F16C 33/583* (2013.01); *F16C 33/62* (2013.01); *B64C 27/10* (2013.01); *B64C 2027/8236* (2013.01); *F16C 2326/43* (2013.01)

(58) Field of Classification Search
CPC . B64C 27/35; B64C 27/10; B64C 2027/8236; F16C 19/00; F16C 33/36; F16C 35/08; F16C 17/107; F16C 27/066; F16F 1/387; F16F 1/393; F16F 1/403
USPC .... 416/134 A, 174; 384/193, 227, 447, 535, 384/582; 267/281
See application file for complete search history.

(56) References Cited

U.S. PATENT DOCUMENTS

| | | | |
|---|---|---|---|
| 4,129,403 A | * | 12/1978 | Watson ................... B64C 27/35 416/134 A |
| 4,714,450 A | | 12/1987 | Byrnes et al. |

(Continued)

*Primary Examiner* — Nathaniel E Wiehe
*Assistant Examiner* — Emily S Adelman
(74) *Attorney, Agent, or Firm* — Cantor Colburn LLP

(57) ABSTRACT

A bearing sleeve assembly includes a rigid inner element having a cylindrical inner diameter bore and an outer surface that is non-cylindrical. Also included is a rigid outer element spaced radially outwardly from the rigid inner element, the rigid outer element comprising a cylindrical member with a uniform cross-section that forms a ring with an inner-diameter surface and an outer-diameter surface, the outer element's inner-diameter surface and the non-cylindrical outer surface of the inner element defining a non-uniform annulus therebetween. Further included is an elastomeric core disposed between the rigid inner element and the rigid outer element within the non-uniform annulus, the elastomeric core having a first thickness at a first location and a second thickness at a second location, the first thickness being greater than the second thickness.

15 Claims, 6 Drawing Sheets

(51) Int. Cl.
*F16C 33/62* (2006.01)
*B64C 27/10* (2006.01)
*B64C 27/82* (2006.01)

(56) References Cited

U.S. PATENT DOCUMENTS

| | | | | |
|---|---|---|---|---|
| 4,765,758 | A | * | 8/1988 | O'Donnell ............... B64C 27/35 |
| | | | | 267/141.1 |
| 4,895,354 | A | | 1/1990 | Byrnes |
| 6,378,853 | B1 | | 4/2002 | Kammel et al. |
| 7,909,313 | B2 | | 3/2011 | Siemer et al. |
| 2008/0253891 | A1 | * | 10/2008 | Cabrera .................. B64C 27/10 |
| | | | | 416/134 A |
| 2009/0155086 | A1 | * | 6/2009 | Parisy ..................... B64C 27/32 |
| | | | | 416/226 |
| 2016/0091017 | A1 | * | 3/2016 | Mueller .................. F16C 17/22 |
| | | | | 384/125 |

* cited by examiner

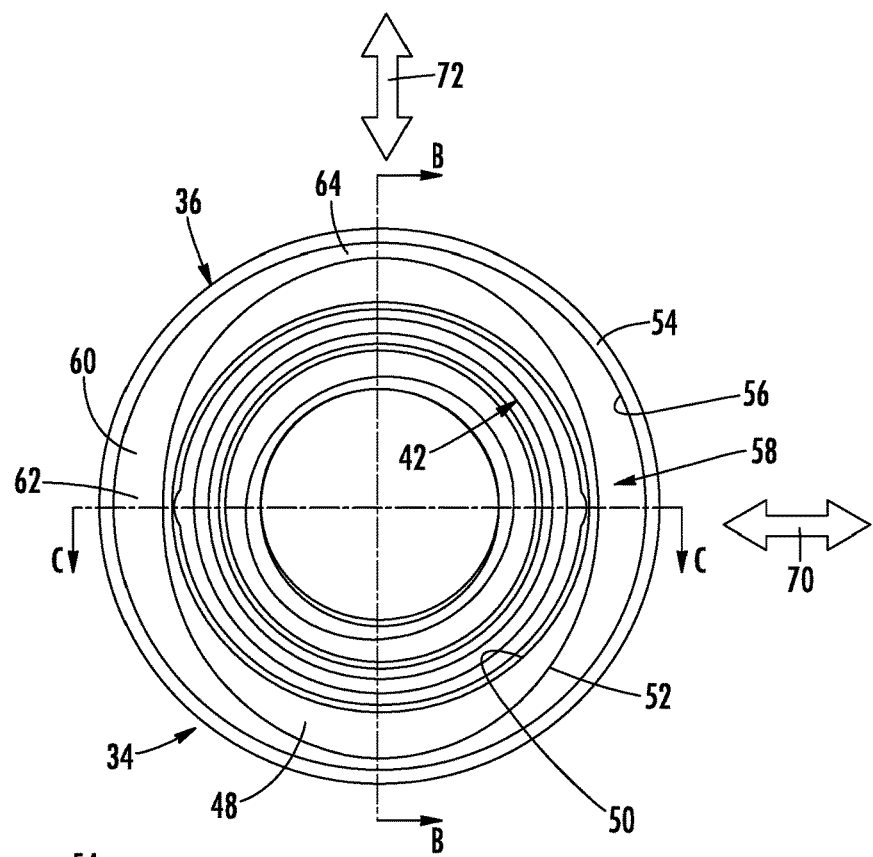
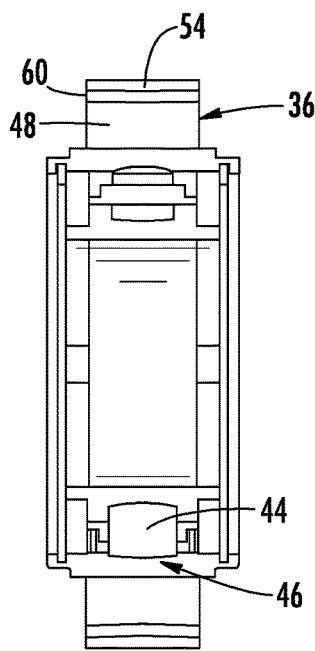
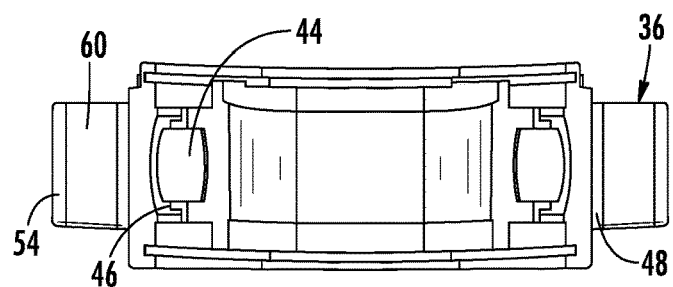
FIG. 4
FIG. 5
FIG. 6

DIRECTIONAL STIFFNESS BEARING SLEEVE ASSEMBLY FOR ROTOR SYSTEMS

CROSS-REFERENCE TO RELATED APPLICATIONS

The present application claims priority to U.S. Provisional Application No. 62/274,490, filed on Jan. 4, 2016, the contents of which are incorporated by reference herein in their entirely.

FEDERAL RESEARCH STATEMENT

The content of this disclosure was made with Government support under Contract No. W911W6-13-2-0003 with the United States Army. The Government has certain rights in the application.

BACKGROUND

The embodiments herein relate to bearing assemblies and, more particularly, to a bearing sleeve assembly that may be used within a rotor system; namely within a rotary-wing aircraft.

Rotary wing aircraft include rotor systems and rotor blade assemblies to generate lift and allow for controlled operation of the air vehicle. During vehicle operation, the rotor blades are influenced by aerodynamic and inertial forces. Accordingly, each blade will experience elastic deformation as well as rigid body motion as a consequence of the forces acting upon it, referred to herein as blade dynamics. As a result of blade dynamics, rotor systems may be susceptible to forms of aero-elastic and aero-mechanical instabilities. In the pursuit of increased vehicle performance, new compound rotor-craft designs incorporate a coaxial rotor configuration with rigid rotor blades. A byproduct of such a configuration is that no appreciable relative motion occurs between the blade and the hub assembly, which precludes the ability to integrate a damping mechanism. Thus, aero-elastic stability is predominantly dictated by the combined elastic stiffness of the main rotor blade and hub assembly.

To address dynamic stability issues, it is desirable for significant separation to exist in the blade's natural frequencies (namely the first flatwise and edgewise modes). The primary means of ensuring frequency separation in underdamped systems is through the tailoring of stiffness in the degrees of freedom of concern. In the context of a rotor system, one area that has a significant effect on the edgewise and flatwise stiffness values is the hub assembly. Helicopters utilize bearings, which are contained within the hub assembly, to accommodate pitch changes of rotor blades. However, in a rigid rotor design the blade's flapping and lagging hinges are removed and made rigid. Thus, the blade bending moments imposed on the hub are increased in comparison to an articulated rotor configuration. The increased loading present in rigid rotor systems shifts the design towards the need to incorporate metallic pitch-bearing designs so as not to accommodate large radial load capacity as well as to ensure low impedance in accommodating changes in blade pitch. Rotary bearings of metallic construction incorporate cylindrical raceways that have an isotropic radial stiffness gradient through the element due to the symmetry of the design. Therefore, the isotropic radial stiffness properties of the bearing race results in equal stiffness values in the flatwise and edgewise directions. A challenge exists in the design of such a rotor system to accommodate the desirable traits of a rigid rotor system, while accommodating tailored stiffness values in the edgewise and flatwise orientations to avoid aero-elastic instability.

BRIEF DESCRIPTION

According to one embodiment, a bearing sleeve assembly includes a rigid inner element having a cylindrical inner diameter bore and an outer surface that is non-cylindrical. Also included is a rigid outer element spaced radially outwardly from the rigid inner element, the rigid outer element comprising a cylindrical member with a uniform cross-section that forms a ring with an inner-diameter surface and an outer-diameter surface, the outer element's inner-diameter surface and the non-cylindrical outer surface of the inner element defining a non-uniform annulus therebetween. Further included is an elastomeric core disposed between the rigid inner element and the rigid outer element within the non-uniform annulus, the elastomeric core having a first thickness at a first location and a second thickness at a second location, the first thickness being greater than the second thickness.

In addition to one or more of the features described above, or as an alternative, further embodiments may include that the rigid inner element is formed of a metallic material.

In addition to one or more of the features described above, or as an alternative, further embodiments may include that the rigid outer element is formed of a metallic material.

In addition to one or more of the features described above, or as an alternative, further embodiments may include that the bearing sleeve assembly has a first stiffness proximate the first location of the elastomeric core and a second stiffness proximate the second location of the elastomeric core, the second stiffness being greater than the first stiffness.

In addition to one or more of the features described above, or as an alternative, further embodiments may include that the bearing sleeve assembly is operatively coupled to a connecting a rotor hub and a rotor blade.

In addition to one or more of the features described above, or as an alternative, further embodiments may include that the outer surface of the rigid inner element is elliptical.

According to another embodiment, a rotor system includes a rotor hub, a rotor blade and a spindle assembly operatively connecting the rotor hub within a non-pitching frame and the rotor blade within the pitching frame, the spindle assembly having a first bearing assembly. The first bearing assembly includes a first pitch bearing and a first bearing sleeve assembly, the bearing sleeve assembly including a first rigid inner element connected to the first pitch bearing. The first bearing sleeve assembly also includes a first rigid outer element spaced radially outwardly from the first rigid inner element, the first rigid inner element and the first rigid outer element defining a first non-uniform annulus therebetween. The first bearing sleeve assembly further includes a first elastomeric core disposed between the first rigid inner element and the first rigid outer element within the first non-uniform annulus, the first elastomeric core having a non-uniform thickness.

In addition to one or more of the features described above, or as an alternative, further embodiments may include a second bearing sleeve assembly disposed closer to the rotor hub relative to the first bearing sleeve assembly.

In addition to one or more of the features described above, or as an alternative, further embodiments may include a second bearing sleeve assembly disposed further from the rotor hub relative to the first bearing sleeve assembly.

In addition to one or more of the features described above, or as an alternative, further embodiments may include the first rigid inner element having a cylindrical inner diameter bore and an outer surface that is elliptical, the first rigid outer element having a cylindrical inner diameter.

In addition to one or more of the features described above, or as an alternative, further embodiments may include the first elastomeric core having a first thickness at a first location and a second thickness at a second location, the first thickness being greater than the second thickness, wherein the bearing sleeve assembly has a first stiffness proximate the first location of the first elastomeric core and a second stiffness proximate the second location of the first elastomeric core, the second stiffness being greater than the first stiffness.

In addition to one or more of the features described above, or as an alternative, further embodiments may include that the first stiffness is in an edgewise direction of the rotor blade and the second stiffness is in a flatwise direction of the rotor blade.

In addition to one or more of the features described above, or as an alternative, further embodiments may include that the rigid inner element is formed of a metallic material.

In addition to one or more of the features described above, or as an alternative, further embodiments may include that the rigid outer element is formed of a metallic material.

In addition to one or more of the features described above, or as an alternative, further embodiments may include that the second bearing sleeve assembly includes a second rigid inner element. Also included is a second rigid outer element spaced radially outwardly from the second rigid inner element, the second rigid inner element and the second rigid outer element defining a second non-uniform annulus therebetween. Further included is a second elastomeric core disposed between the second rigid inner element and the second rigid outer element within the second non-uniform annulus, the second elastomeric core having a non-uniform thickness.

BRIEF DESCRIPTION OF THE DRAWINGS

The subject matter which is regarded as the present disclosure is particularly pointed out and distinctly claimed in the claims at the conclusion of the specification. The foregoing and other features and advantages of the present disclosure are apparent from the following detailed description taken in conjunction with the accompanying drawings in which:

FIG. 4 is an elevational view of a bearing assembly;

FIG. 5 is a cross-sectional view of the bearing assembly taken along line B-B of FIG. 4;

FIG. 6 is a cross-sectional view of the bearing assembly taken along line C-C of FIG. 4;

DETAILED DESCRIPTION

Figure 1:
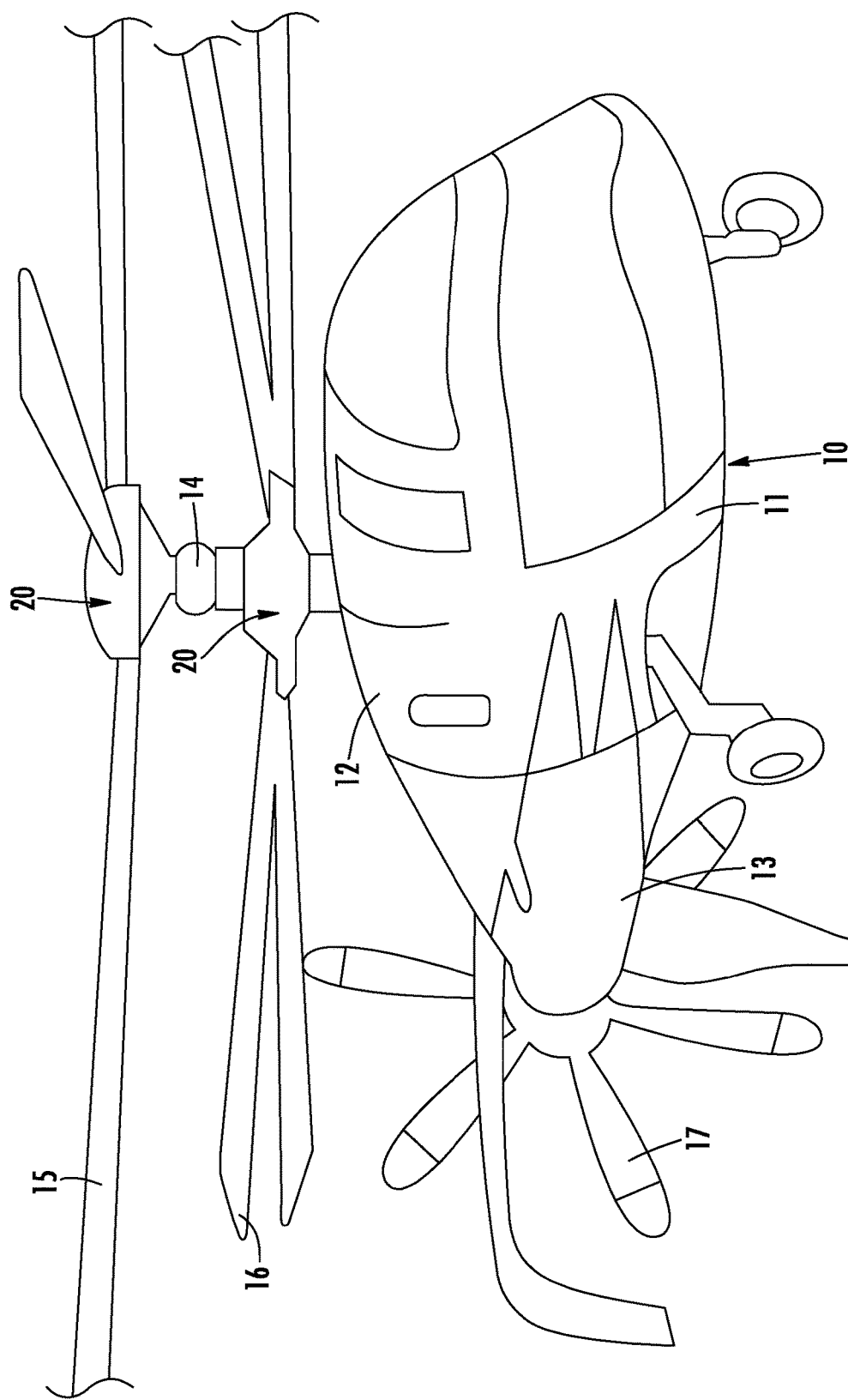
FIG. 1 is a perspective view of a rotary-wing aircraft.

Referring to FIG. 1, a rotor system, such as a helicopter 10, is provided. The helicopter 10 includes a fuselage 11 that is formed to define an interior cabin in which a pilot and passengers may be situated. The fuselage 11 includes a pylon section 12 at a top portion thereof and a tail section 13 at a trailing end thereof. The pylon section 12 is supportive of a main rotor shaft 14 that is rotatable about its longitudinal or vertical axis relative to the fuselage 11. The main rotor shaft 14 is respectively coupled to substantially rigid coaxial main rotor blades 15 and 16 proximate a rotor hub 20, which rotate with the main rotor shaft 14 to provide a lift force for the helicopter 10. The tail section 13 is supportive of a propeller shaft (not shown) that is rotatable about a longitudinal axis thereof relative to the fuselage 11 and in a plane defined transversely with respect to a rotational plane of the main rotor shaft 14. The propeller shaft is coupled to a pusher propeller 17, which rotates with the propeller shaft, to provide thrust to the helicopter 10. As illustrated, the helicopter 10 is a compound or coaxial helicopter although it is to be understood that the embodiment is merely illustrative and that the description provided herein may be applicable to various rotor system designs. For example, a rotary wing aircraft with a single main rotor system and an anti-torque tail rotor system will also benefit from the disclosure.

Although the disclosed embodiments are described herein in the context of a helicopter, it is to be appreciated that any machine or system that includes oscillatory motion may benefit from the disclosure. For example, the disclosed embodiments may be employed with components associated with wind turbines or fixed wing systems with thrust providing propeller style propulsion systems.

Figure 2:
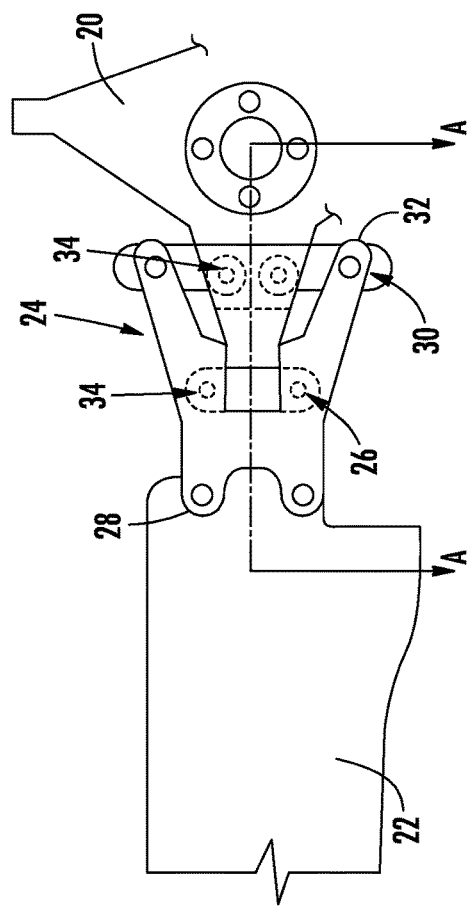
FIG. 2 is a plan view of a connector assembly connecting a hub, a spindle assembly and a rotor blade according to an embodiment.
Figure 3:
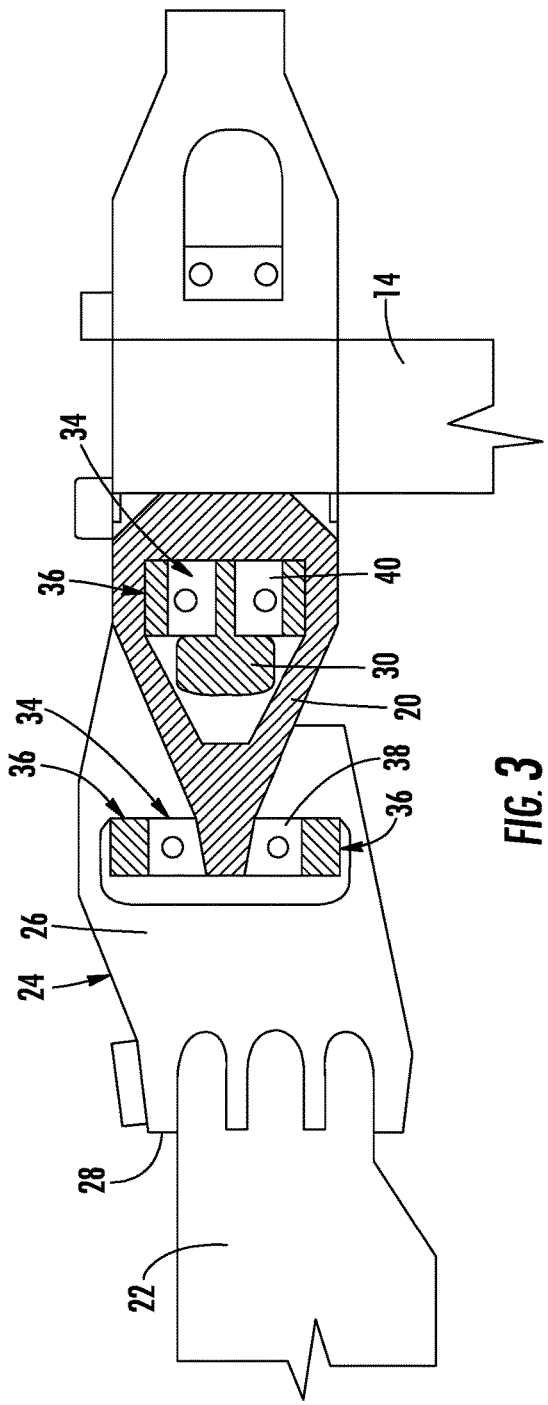
FIG. 3 is a cross-sectional view of hub, spindle assembly and rotor blade taken along line A-A of FIG. 2.
Figure 7:
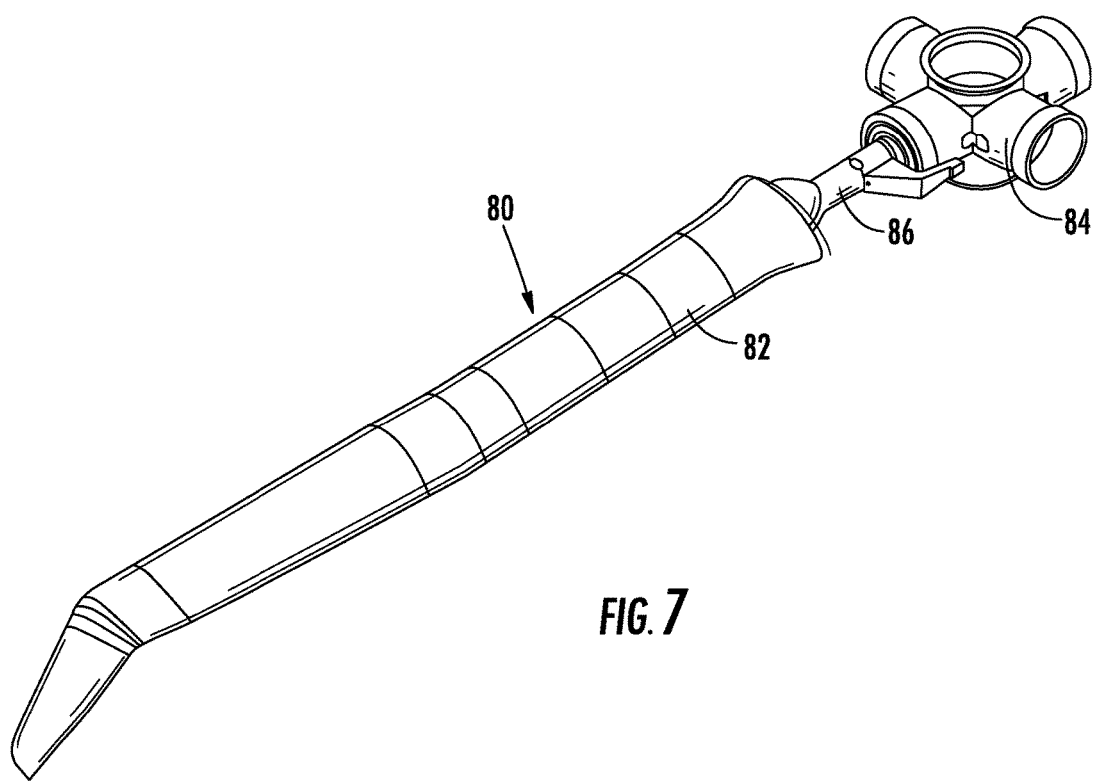
FIG. 7 is a perspective view of a hub, spindle assembly and rotor blade according to another embodiment.
Figure 8:
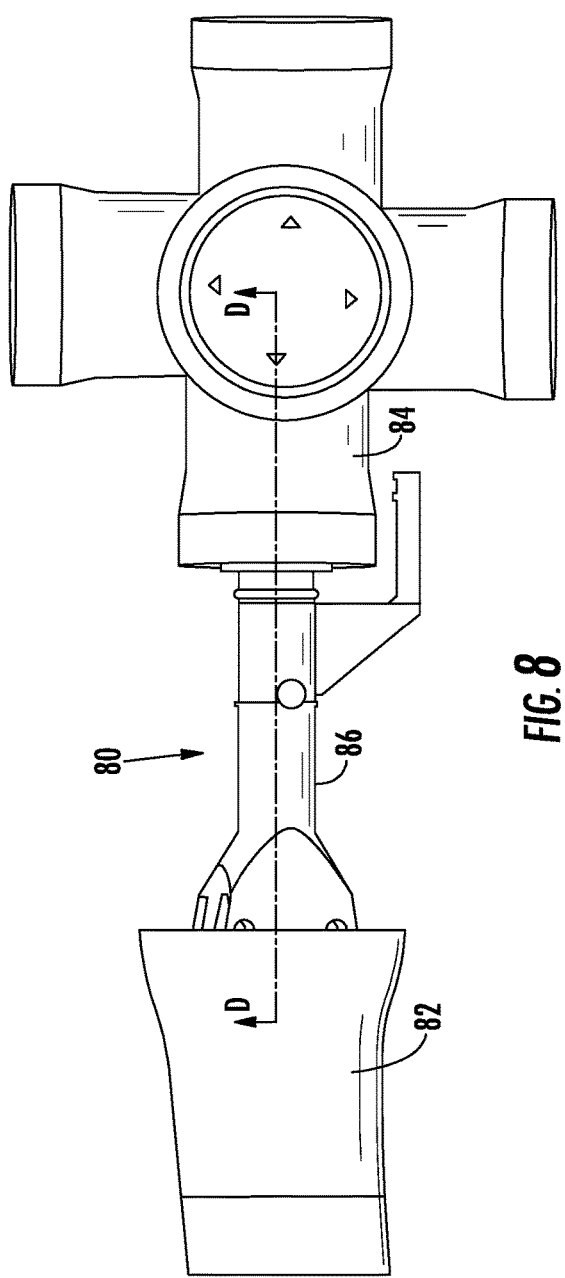
FIG. 8 is a top view of the spindle assembly of FIG. 7.
Figure 9:
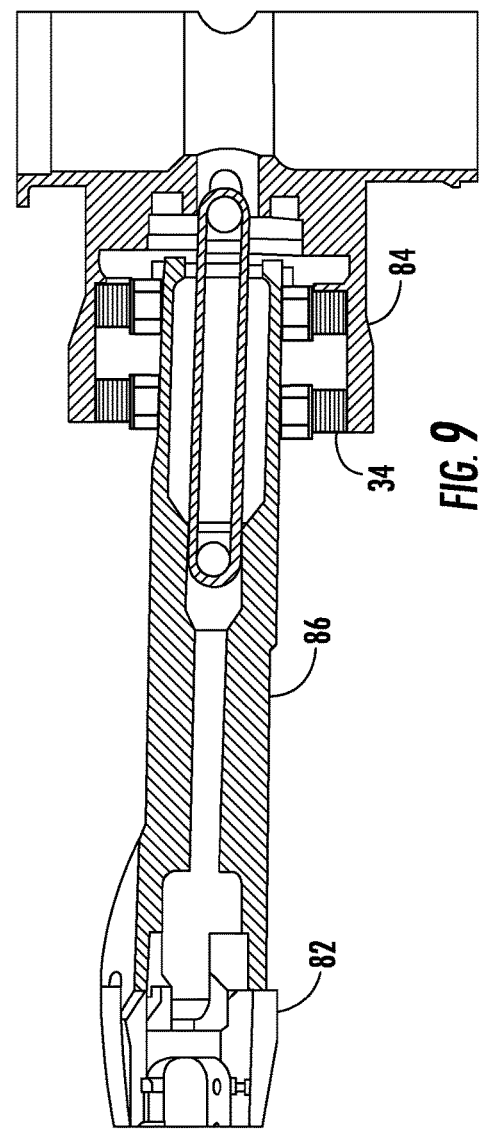
FIG. 9 is a cross-sectional view of the spindle assembly taken along line D-D of FIG. 8.
Figure 10:
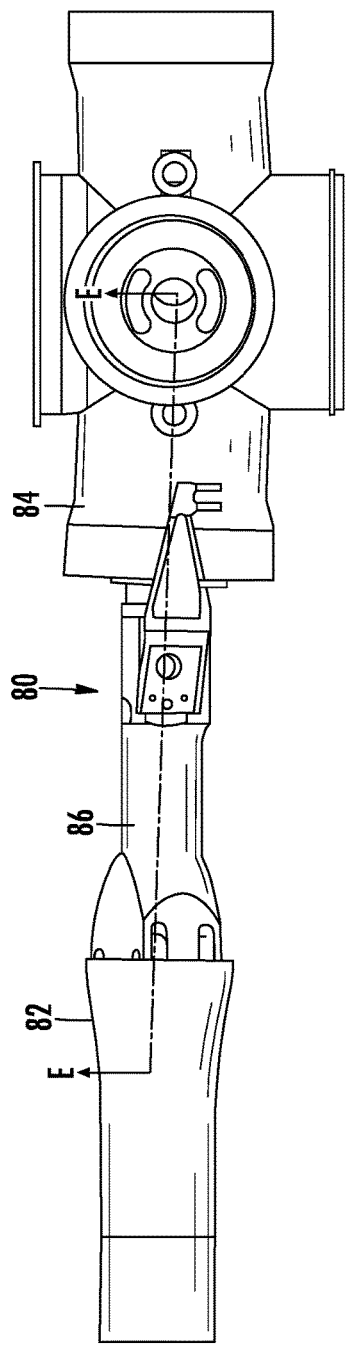
FIG. 10 is an elevational front view of the spindle assembly of FIG. 7.
Figure 11:
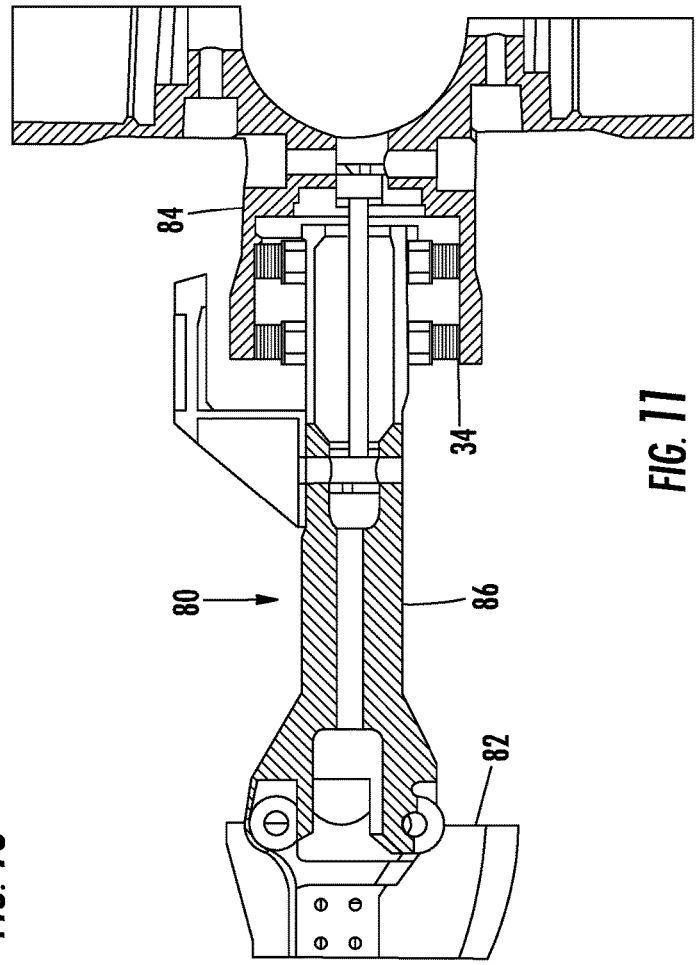
FIG. 11 is a cross-sectional view of the spindle assembly taken along line E-E of FIG. 10.

Referring now to FIGS. 2 and 3, with continued reference to FIG. 1, a single rotor blade 22 that is one of the rotor blades 15 and/or 16 is illustrated and described. In particular, a connector assembly 24 is illustrated. The connector assembly 24 is employed to operatively couple the rotor blade 22 to the rotor hub 20. The connector assembly 24 includes a cuff 26 coupled to the rotor blade 22 proximate a first end 28 of the cuff 26 and coupled to a T-bar 30 proximate a second end 32 of the cuff 26. The T-bar 30 is coupled to the rotor hub 20. The aforementioned assembly operatively couples the rotor blade 22 to the rotor hub 20. At least one bearing assembly 34 is included as part of the connector assembly 24, the bearing assembly 34 accommodating pitch changes of the rotor blade 22 during operation. As will be described below, a bearing sleeve assembly 36 is provided in the bearing assembly 34 to overcome challenges associated with rigid rotor blades.

In the illustrated embodiment, a first bearing assembly 38 and a second bearing assembly 40, each with respective bearing sleeve assemblies 36, are included, with the first bearing assembly 38 being disposed further from the rotor hub 20 relative to the second bearing assembly 40. These may be designated as an outboard bearing assembly and an inboard bearing assembly, respectively. The first bearing assembly 38 is connected to the hub 20 and T-bar 30, and the second bearing assembly 40 is connected to the hub 20 and the cuff 26 of the rotor blade 22 The bearing sleeve assembly 36 described below may be implemented in the first bearing assembly 38 and/or the second bearing assembly 40. In other words, either or both of the bearing assemblies may utilize the bearing sleeve assembly 36 described herein.

It is to be appreciated that numerous alternative rotor systems may benefit from the embodiments described herein. For example, alternatives to the cuff and sleeve embodiment described above and shown in FIGS. 2 and 3 may include the bearing assembly 34 described herein. A spindle assembly 80 is shown in FIGS. 7-11 to illustrate such an example. The spindle assembly 80 may be used in a wide variety of applications spanning numerous industries, including but not limited to wind turbine applications, for example. The spindle assembly 80 includes a rotor blade 82, a rotor hub 84 and a spindle connector assembly 86. As shown in the sectional views of FIGS. 9 and 11, one or more bearing assemblies represented generally with numeral 34 may be included and connect the rotor hub 84 and the spindle connector assembly 86. The bearing assemblies 34 correspond to the first bearing assembly 38 and the second bearing assembly 40 described in detail in relation to FIGS. 2 and 3.

Referring now to FIGS. 4-6, the bearing assembly 34 is illustrated in greater detail. The bearing assembly 34 includes bearing components, referred to generally with numeral 42, the bearing components 42 including a roller element 44 and a bearing race 46, for example. Irrespective of the particular bearing components included, the bearing components 42 are generally cylindrical and are concentrically surrounded by an inner element 48 that is substantially rigid. The inner element 48 may be formed of any suitable rigid material. In some embodiments, the inner element 48 is formed of a metallic material. The inner element 48 includes a radially inner surface 50 that is substantially cylindrical and a radially outer surface 52 that is substantially non-circular. Together, the radially inner surface 50 and the radially outer surface 52 cause the inner element 48 to have a non-uniform thickness radially. In the illustrated embodiment, the radially outer surface 52 is elliptical to achieve the non-uniform thickness of the inner element 48. In the case of an elliptical radially outer surface, the thickness of the inner element 48 varies in an axisymmetric manner, as shown.

The bearing sleeve assembly 36 also includes an outer element 54 that is substantially rigid. The outer element 54 may be formed of any suitable rigid material and may be connectable to an element such as the cuff 26 or the hub 20. In some embodiments, the outer element 54 is formed of a metallic material. The outer element 54 includes a radially inner surface 56 that is cylindrical and is spaced radially outwardly from the inner element 48. The radially inner surface 56 of the outer element 54 and the radially outer surface 52 of the inner element 48 define a non-uniform annulus 58 therebetween due to the non-circular geometry of the radially outer surface 52.

A core 60 is fittingly disposed between the inner element 48 and the outer element 54 within the non-uniform annulus 58. The core 60 is formed of an elastomeric material to be compliant in response to loads applied on the bearing assembly 34. The core 60 is in contact with the radially outer surface 52 of the inner element 48 and the radially inner surface 56 of the outer element 54. Due to the non-uniform annulus 58, the core 60 is formed to have a non-uniform thickness. In the case of the illustrated elliptical outer surface 52 of the inner element 48, the inner surface of the core 60 is correspondingly elliptical and the outer surface is cylindrical to correspond to the inner surface 56 of the outer element 54. In such an embodiment, the thickness of the core 60 is axisymmetric to result in a first thickness 62 at a first location and a second thickness 64 at a second location. Notably, in an axisymmetric embodiment identical thicknesses are present on opposing sides of each of the first thickness 62 and the second thickness 64. As shown, the first thickness 62 is greater than the second thickness 64. The thicker elastomeric section (i.e., first thickness 62) results in more overall deformation under an applied radial load, thereby yielding a lower effective thickness in response to loads applied in an edgewise direction 70 of the rotor blade 22. Conversely, the thinner elastomeric section (i.e., second thickness 64) results in less overall deformation under an applied radial load, thereby yielding a higher effective stiffness in response to loads applied in a flatwise direction 72 of the rotor blade 22.

The above-described core 60, in combination with the rigid inner and outer elements 48, 52, provides a directional stiffness gradient through the bearing assembly 34 that may be tailored to suit the load demands of the particular application. This is particularly advantageous for rigid rotor configurations where it is desirable to significantly separate the natural frequencies that exist in the blade flatwise and edgewise orientations. The embodiments described herein allow tailoring of the stiffness gradient by relying on largely metallic load path resistance in one direction, while utilizing largely elastomeric load path resistance in the other direction.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A bearing sleeve assembly comprising:
    a rigid inner element having a non-circular cross-section including a cylindrical inner diameter bore and an outer surface that is non-cylindrical;
    a rigid outer element spaced radially outwardly from the rigid inner element, the rigid outer element comprising a cylindrical member with a uniform cross-section that forms a ring with an inner-diameter surface and an outer-diameter surface, the outer element's inner-diameter surface and the non-cylindrical outer surface of the inner element defining a non-uniform annulus therebetween; and
    an elastomeric core disposed between the rigid inner element and the rigid outer element within the non-uniform annulus, the elastomeric core having a first thickness at a first location and a second thickness at a second location, the first thickness being greater than the second thickness.

2. The bearing sleeve assembly of claim 1, wherein the rigid inner element is formed of a metallic material.

3. The bearing sleeve assembly of claim 1, wherein the rigid outer element is formed of a metallic material.

4. The bearing sleeve assembly of claim 1, wherein the bearing sleeve assembly has a first stiffness proximate the first location of the elastomeric core and a second stiffness proximate the second location of the elastomeric core, the second stiffness being greater than the first stiffness.

5. The bearing sleeve assembly of claim 1, wherein the bearing sleeve assembly is operatively coupled to a connector assembly connecting a rotor hub and a rotor blade.

6. The bearing sleeve assembly of claim 1, wherein the outer surface of the rigid inner element is elliptical.

7. A rotor system comprising:
   a rotor hub;
   a rotor blade; and
   a spindle assembly operatively connecting the rotor hub and the rotor blade, the spindle assembly having a first bearing assembly comprising:
   a first pitch bearing; and
   a first bearing sleeve assembly, the bearing sleeve assembly comprising:
   a first rigid inner element connected to the first pitch bearing, the first rigid inner element having a non-circular cross-section including a cylindrical inner diameter bore and an outer surface that is non-cylindrical;
   a first rigid outer element spaced radially outwardly from the first rigid inner element, the first rigid inner element and the first rigid outer element defining a first non-uniform annulus therebetween; and
   a first elastomeric core disposed between the first rigid inner element and the first rigid outer element within the first non-uniform annulus, the first elastomeric core having a non-uniform thickness.

8. The rotor system of claim 7, further comprising a second bearing sleeve assembly disposed closer to the rotor hub relative to the first bearing sleeve assembly.

9. The rotor system of claim 8, wherein the second bearing sleeve assembly comprises:
   a second rigid inner element;
   a second rigid outer element spaced radially outwardly from the second rigid inner element, the second rigid inner element and the second rigid outer element defining a second non-uniform annulus therebetween; and
   a second elastomeric core disposed between the second rigid inner element and the second rigid outer element within the second non-uniform annulus, the second elastomeric core having a non-uniform thickness.

10. The rotor system of claim 7, further comprising a second bearing sleeve assembly disposed further from the rotor hub relative to the first bearing sleeve assembly.

11. The rotor system of claim 7, the first rigid inner element having a cylindrical inner diameter bore and an outer surface that is elliptical, the first rigid outer element having a cylindrical inner diameter.

12. The rotor system of claim 7, the first elastomeric core having a first thickness at a first location and a second thickness at a second location, the first thickness being greater than the second thickness, wherein the bearing sleeve assembly has a first stiffness proximate the first location of the first elastomeric core and a second stiffness proximate the second location of the first elastomeric core, the second stiffness being greater than the first stiffness.

13. The rotor system of claim 12, wherein the first stiffness is in an edgewise direction of the rotor blade and the second stiffness is in a flatwise direction of the rotor blade.

14. The rotor system of claim 7, wherein the rigid inner element is formed of a metallic material.

15. The rotor system of claim 7, wherein the rigid outer element is formed of a metallic material.

* * * * *